United States Patent
Edelmann et al.

(10) Patent No.: US 6,168,313 B1
(45) Date of Patent: Jan. 2, 2001

(54) BEARING UNIT INCLUDING LINEAR BEARING

(75) Inventors: Ludwig Edelmann, Sulzthal; Andreas Geyer, Mainberg; Hermann Glöckner, Schweinfurt; Georg Hierl, Schweinfurt; Holger Kristandt, Schweinfurt; Uwe Mayer, Münnerstadt; Henryk Velde, Werneck; Lothar Walter, Schweinfurt, all of (DE)

(73) Assignee: SKF Linearsysteme GmbH, Schweinfurt (DE)

( * ) Notice: Under 35 U.S.C. 154(b), the term of this patent shall be extended for 0 days.

(21) Appl. No.: 09/247,518

(22) Filed: Feb. 10, 1999

(30) Foreign Application Priority Data

Feb. 14, 1998 (DE) .............................. 198 06 139

(51) Int. Cl.$^7$ .................................................. F16C 29/06
(52) U.S. Cl. ............................................ 384/43; 384/45
(58) Field of Search .......................................... 384/43, 45

(56) References Cited

U.S. PATENT DOCUMENTS

| | | | |
|---|---|---|---|
| 3,265,449 | * 8/1966 | Jahn ........................................ | 384/43 |
| 3,540,782 | * 11/1970 | Worm ..................................... | 384/43 |
| 3,545,826 | * 12/1970 | Magee et al. ....................... | 384/45 X |
| 3,900,233 | * 8/1975 | Thomson ............................... | 384/43 |
| 4,123,121 | * 10/1978 | Ernst et al. ......................... | 384/45 X |
| 4,239,299 | * 12/1980 | Hoffmann et al ................... | 384/43 X |
| 4,411,478 | * 10/1983 | Olschewski et al. .................. | 384/43 |
| 4,512,617 | * 4/1985 | Saravis et al. ....................... | 384/43 X |
| 4,989,996 | * 2/1991 | Binder et al. .......................... | 384/45 |

FOREIGN PATENT DOCUMENTS

| | | |
|---|---|---|
| 1 268 442 | 5/1968 | (DE) . |
| 15 75 608 | 2/1981 | (DE) . |
| 26 31 808 | 10/1983 | (DE) . |
| 0 636 803 | 2/1995 | (EP) . |

* cited by examiner

*Primary Examiner*—Khoi Q. Ta
(74) *Attorney, Agent, or Firm*—Burns, Doane, Swecker & Mathis, L.L.P.

(57) ABSTRACT

A bearing unit includes a housing provided with a cylindrical bore and a linear bearing positioned within the cylindrical bore. The linear bearing includes a cage in which are arranged a plurality of endless ball rows each defined by a longitudinally extending ball track for load-bearing balls, a longitudinally extending return track for non-load-bearing balls, and deflection tracks connecting ends of the longitudinally extending ball track and the longitudinally extending return track. Each longitudinally extending ball track opens radially outwardly with a track plate being arranged to cover the longitudinally extending ball track for the load-bearing balls. The cylindrical bore of the housing is provided with a plurality of recesses each located in an area of the cylindrical bore facing one axial end of one of the track plates to permit radial deflection of the one axial end of the track plate.

8 Claims, 3 Drawing Sheets

BEARING UNIT INCLUDING LINEAR BEARING

This application corresponds to and claims priority under 35 U.S.C. §119 with respect to German Application No. P 19806139.0 filed on Feb. 14, 1998, the entire content of which is incorporated herein by reference.

FIELD OF THE INVENTION

The present invention generally relates to bearings. More particularly, the present invention pertains to a linear bearing integrated into a cylindrical bore provided in a housing.

BACKGROUND OF THE INVENTION

Linear bearings are typically constructed to possess a cage in which are arranged several infinite or endless ball rows consisting of circumferentially distributed and longitudinally extending ball tracks for load-bearing balls, and longitudinally extending return tracks for non-load-bearing balls. Deflection tracks connect the longitudinally extending tracks in pairs at the ends and track plates are arranged in longitudinal slits of the cage which radially outwardly cover the ball tracks for the load-bearing balls.

In known linear bearings of this type, the track plates arranged in the longitudinal slits of the cage rest over their entire length with the outer surface fully on the cylindrical bore of the housing as described in DE-PS 12 68 442. In the case of momentary load and/or shaft bending or form errors in the guide system, this solution is so rigid that in some cases the balls running into the tracks of the track plates may jam. The consequences of this are jerky or non-smooth movements and sawing noises.

DE-PS 15 75 608 discloses another linear bearing design in which the track plates have a support in the center of their length, and are angled from this support point towards the ends. The track plates are thus able to swivel about the support point in relation to the cylindrical bore of the housing, and thus are able to compensate for shaft bending to a certain extent. In this bearing construction, the support points may work themselves into the housing, resulting in an increase in operating play. As a result, reduced rigidity can arise, and a loss in bearing capacity and thus useful life can occur.

In an attempt to avoid this, hardened support rigs are sometimes pushed over the track plates as described in EP-0 636 803 A1. However, this necessarily requires additional components.

Other proposed alternatives involving the use of funnel-shaped intakes into the track plates as disclosed in DE-PS 26 31 808 have not proved to be an acceptable solution to the above-described problems because load peaks still continue to occur at the ball intake. This does not even take into account that the intakes require additional working steps.

In light of the foregoing, a need exists for a linear bearing unit that is not as susceptible to the same disadvantages and drawbacks as other know linear bearing units.

It would thus be desirable to provide a bearing unit having a housing in which is integrated a linear bearing, where in the presence of a relatively high rigidity in the system, a uniform intake of the load-bearing balls is ensured, thus significantly improving the running properties and running noises during momentary load and shaft bending as well as in the presence of form errors in the guide system.

SUMMARY OF THE INVENTION

According to one aspect of the present invention, a bearing unit includes a housing provided with a cylindrical bore and a linear bearing positioned within the cylindrical bore. The linear bearing includes a cage in which are arranged a plurality of endless ball rows each defined by a longitudinally extending ball track for load-bearing balls, a longitudinally extending return track for non-load-bearing balls, and deflection tracks connecting ends of the longitudinally extending ball track and the longitudinally extending return track, with each longitudinally extending ball track being open radially outwardly. A track plate is arranged to cover the longitudinally extending ball track for the load-bearing balls. The cylindrical bore of the housing is provided with a plurality of recesses each located in the area of the cylindrical bore facing one axial end of one of the track plates to permit radial deflection of the one axial end of the track plate.

The recesses provided in the cylindrical bore of the housing make it possible for the end of the track plate to move into the recesses during momentary loads acting on the linear bearing unit and/or during shaft bending, thus enabling a relatively smooth intake of the balls into the tracks of the track plates without significant noise. Thus, the ball running into the track does not come into an abrupt contact with the track plate, but rather experiences a gradual contact with the track plate and is loaded under rolling friction conditions. There are also no longer any load peaks which substantially increases the useful life of the linear bearing.

According to another aspect of the present invention, a bearing unit includes a housing provided with a cylindrical bore and a linear bearing positioned within the cylindrical bore. The linear bearing includes a cage in which is arranged at least one endless ball row defined by a radially outwardly open longitudinally extending ball track for load-bearing balls, a longitudinally extending return track for non-load-bearing balls, and deflection tracks connecting ends of the longitudinally extending ball track and the longitudinally extending return track. The linear bearing also includes a track plate covering the longitudinally extending ball track for the load-bearing balls. A space is provided between the outer surface of the track plate at one axial end and the inner surface of the cylindrical bore of the housing for permitting radial deflection of the axial end of the track plate. The space between the outer surface of the track plate at the one axial end and the inner surface of the cylindrical bore of the housing is greater than the spacing between the outer surface of the track plate at the intermediate portion of the track plate and the inner surface of the cylindrical bore.

BRIEF DESCRIPTION OF THE DRAWING FIGURES

The foregoing and additional features and characteristics associated with the present invention will become more apparent from the following detailed description considered with reference to the accompanying drawing figures in which like elements are designated by like reference numerals and wherein.

DETAILED DESCRIPTION OF THE INVENTION

Figure 1:
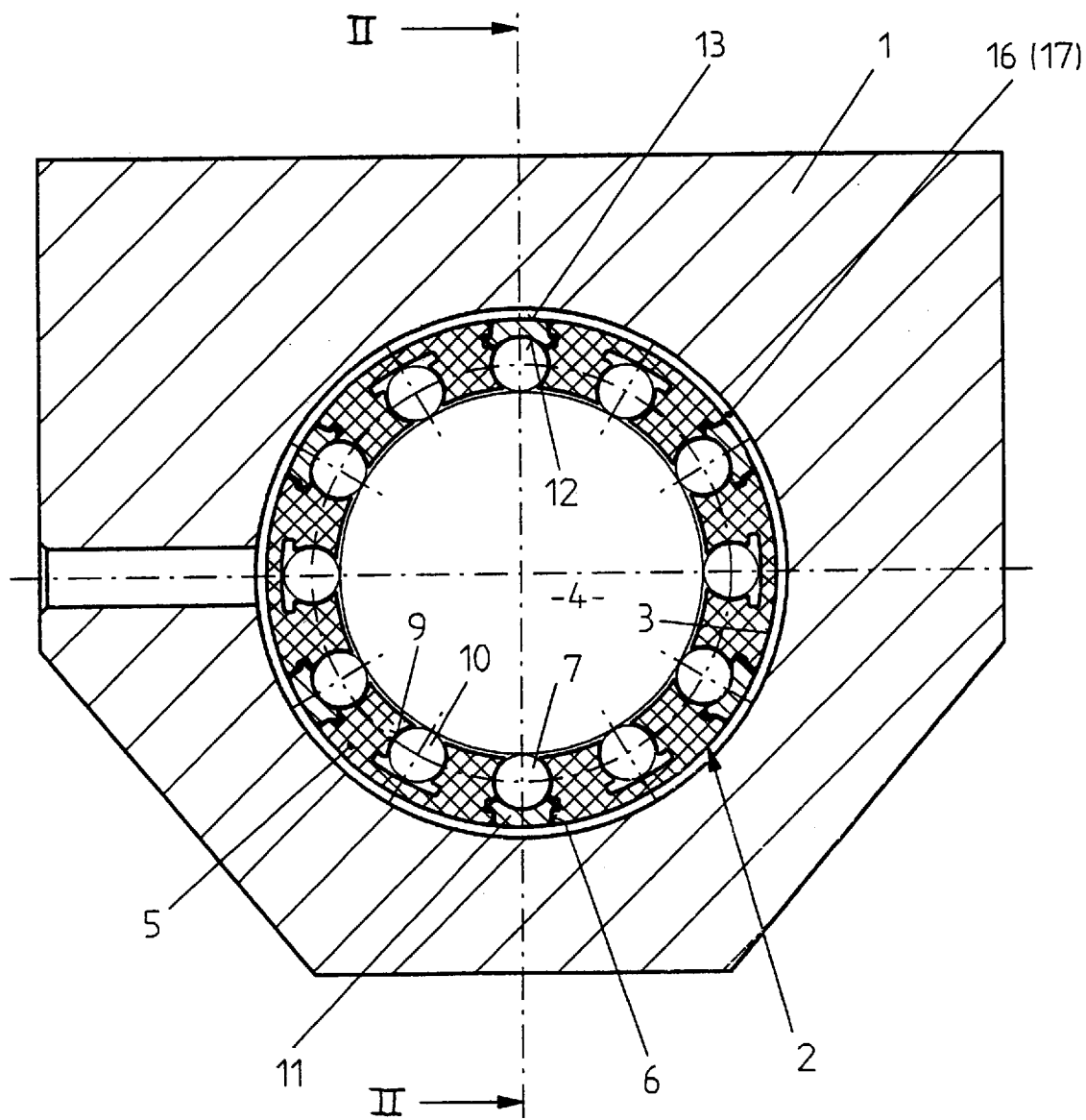
FIG. 1 is a cross-sectional view of the bearing unit according to the present invention.

As seen with reference to FIG. 1, the bearing unit according to the present invention includes a housing 1 provided with a cylindrical bore 3 and a linear bearing 2 fixed inside the cylindrical bore 3 of the housing 1. The linear bearing 2 is adapted to surround a cylindrical shaft 4.

The linear bearing 2 includes a multi-part, cylindrically shaped cage 5 which is provided with a plurality of endless ball rows arranged circumferentially around the cage 5. Each of the endless ball rows includes a radially outwardly opening slot 6 forming a longitudinally extending ball track which receives serially arranged and consecutively positioned load-bearing balls 7. In a known manner, each endless ball row also includes a longitudinally extending return track 9 containing non-load-bearing balls 10, and a pair of semi-circular deflection tracks or turn-around tracks 8 connecting the ends of the longitudinally extending ball track 6 and the longitudinally extending return track 9. A closed series of balls 7, 10 is thus guided inside the cage 5. Each endless or continuous ball track within the cage 5 is thus comprised of a longitudinally extending ball track 6, a longitudinally extending return track 9, and a pair of deflection tracks 8, with the balls moving in the longitudinal slots 6 constituting load-bearing balls 7 and the balls moving in the return tracks 9 constituting non-load-bearing balls 10.

Figure 3:
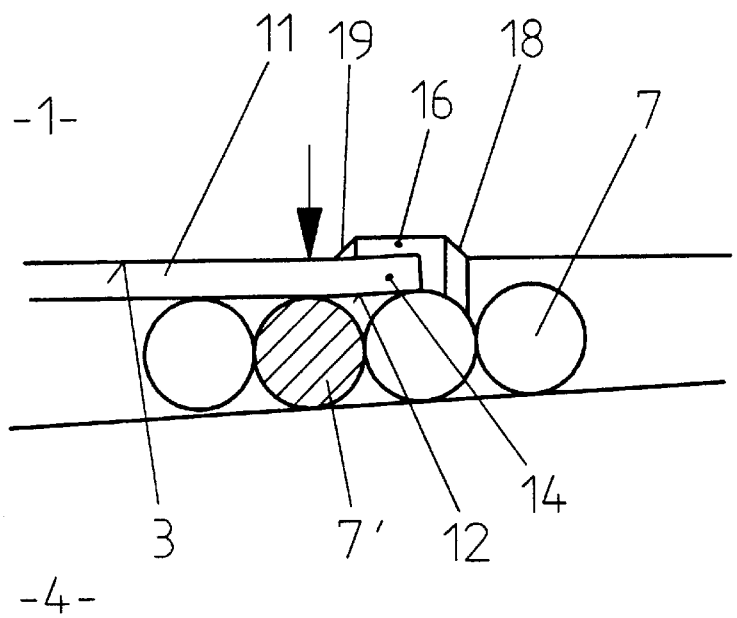
FIG. 3 is an enlarged partial longitudinal cross-sectional view of the portion of the bearing unit shown by the detail III in FIG. 2.

A track plate 11 is set radially from the outside into each of the radially outwardly open longitudinally extending ball tracks 6 of the cage 5 to cover the respective tracks 6 radially towards the outside. As shown in FIG. 3, the track plate 11 is provided with a groove-shaped track 12 that faces radially inwardly. In addition, each track plate 11 is provided with a radially outwardly facing outer surface 13 that is supported in the bore 3 of the housing 1.

Figure 4:
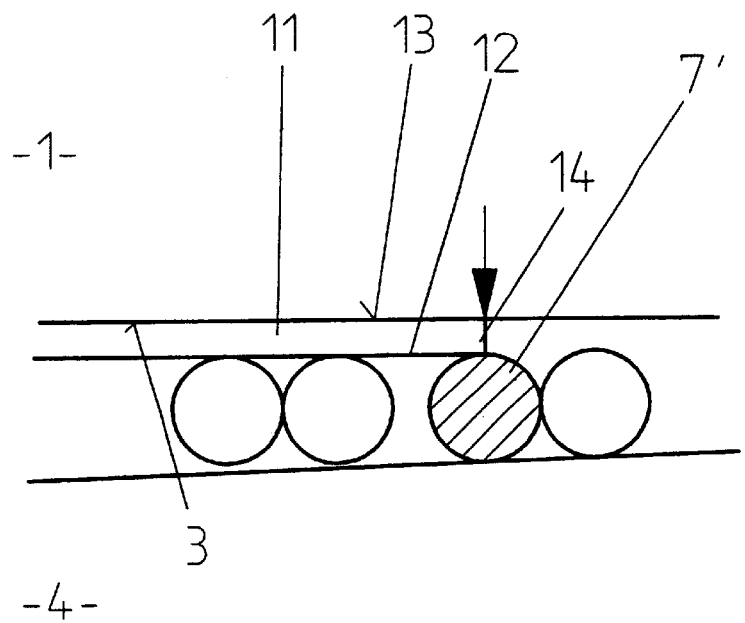
FIG. 4 is an enlarged partial longitudinal cross-sectional view of a portion of a known bearing unit.

In known linear bearing unit designs, the outer surface 13 of the track plates 11 contacts the cylindrical bore 3 of the housing 1 fully over their entire length. As shown in FIG. 4, this means that when the shaft is angled, the ball 7' entering the track 12 in the track plate 11 must pass a narrowed point. This can cause the ball 7' to impact the track plate 11 because the end 14 of the track plate 11 is unable to flex and avoid the impact with the ball 7'.

In the case of the present invention, however, a space is provided between the outer surface of the track plate 11 and the inner surface of the cylindrical bore 3 at the axial ends of the track plates, with such space being greater than in all other areas of the track plates 11 between the axial ends of the track plates 11, to allow the axial ends of the track plates 11 to deflect. In the preferred embodiment of the present invention, this space is defined by an annular recess 16, 17 provided in the cylindrical bore of the housing 1 in the area of each of the axial ends 14, 15 of the track plates 11 as shown in FIGS. 1 and 3. By virtue of this construction, when an angling of the shaft 4 occurs, a space is provided for receiving the respective free end 14 or 15 track plate and the respective free end 14 or 15 of the track plate 11 is able to move into the recess 16 or 17. The balls 7 are thus able to enter the track 12 without impact, and are only loaded after moving a certain distance represented by the ball 7' in FIG. 3 when there are already rolling friction conditions. The width B or axial extent of the recesses 16, 17, whose side edges 18 and 19 are constructed so as to expand at an angle towards the cylindrical bore 3 of the housing 1, and thus the support zone A between the two recesses 16 and 17, can be easily adapted to the expected load and/or shaft bending, without any changes being required with respect to the linear bearing 2 itself.

Figure 2:
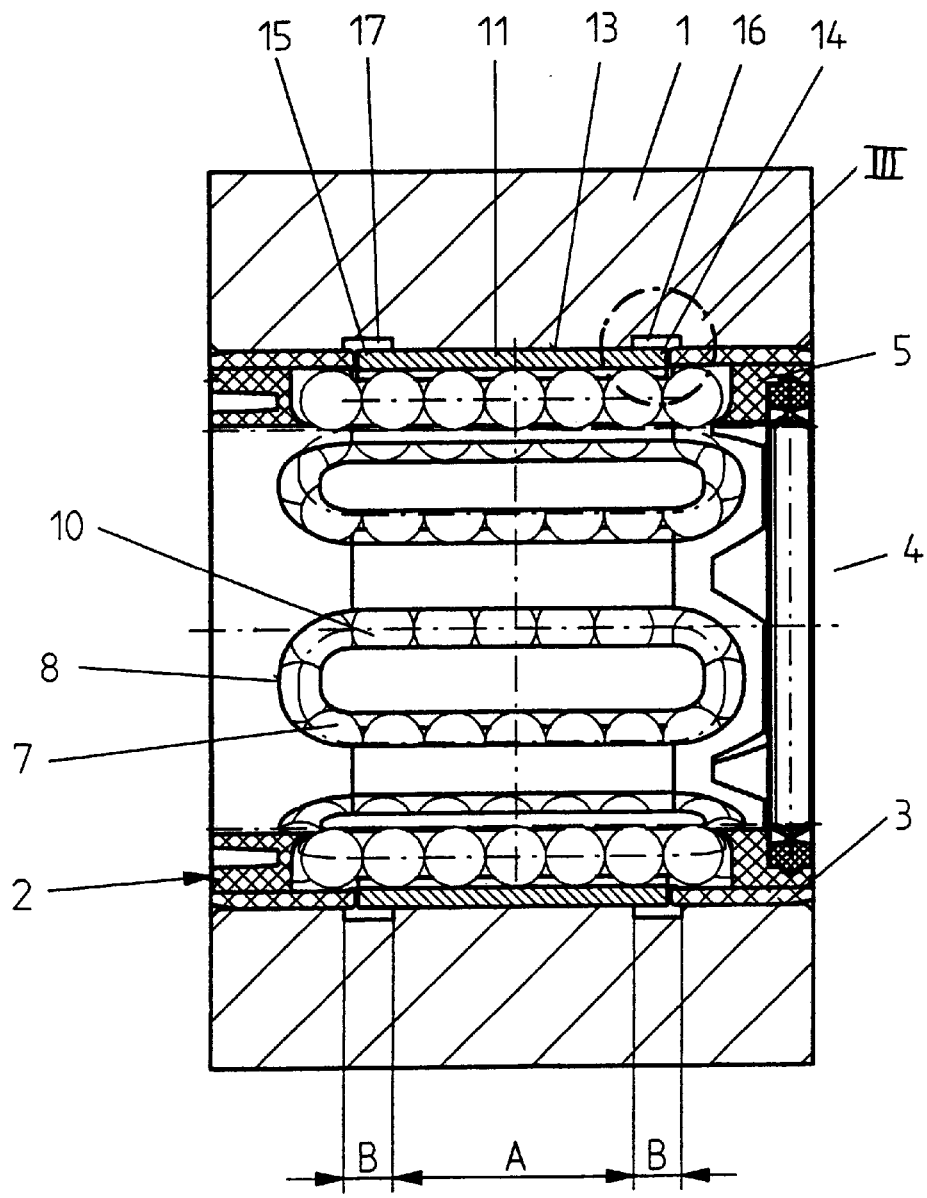
FIG. 2 is a longitudinal cross-sectional view of the bearing unit shown in FIG. 1 taken along the section line II—II.

The recesses 16, 17 that are provided in the cylindrical bore of the housing in the area of the axial ends of each track plate 11, which according to another characteristic of the invention may be constructed as annular grooves, allow the ends of the track plates 11 to bend into the recesses during momentary loads acting on the linear bearing unit and/or during shaft bending. This permits a jerk-free or smooth movement of the balls 7 into the tracks 12 of the track plates 11. Because the ends of the track plates 11 are able to bend, the ball 7 running into the track 12 does not come into an abrupt contact with the track plate 11, but rather comes into gradual contact with the track and is loaded under rolling friction conditions. The balls 7 are thus able to move in a smooth and rather quiet manner. Load peaks thus do not arise and this substantially increases the useful life of the linear bearing unit. The recesses 16, 17 that are provided in the cylindrical bore of the housing in the area of the axial ends of each track plate 11 may be constructed as annular grooves formed in the cylindrical bore of the housing as shown in FIG. 2.

The track plates may have a constant cross-section over their entire length, i.e., they can be constructed in a straight line or linear manner over their entire outer surface, and may also have the same track cross-section over their entire length in the bore. This means that the individual track plates 11 can be cut from longer strips, thus reducing production costs.

The recesses or annular grooves 16, 17 can also be used as a lubricating channel for supplying lubricant to the linear bearing.

According to the present invention, at least the side edges of the recesses or annular grooves 16, 17 oriented towards the inside of the bearing unit are constructed so that they expand at an angle, i.e., they increase towards the cylindrical bore of the housing. This increases the elasticity of the ends of the track plates 11.

As mentioned above, the axial width of the recesses in the cylindrical bore of the housing, and thus the track plate support zones remaining between the recesses, may be selected dependent on the expected load and/or shaft bending, without any changes having to be performed with respect to the linear bearing itself. Here, possible losses of static load-bearing capacity, and to a lesser degree dynamic load-bearing capacity, must be taken into account.

It is to be understood that the present invention is not limited to bearing units having a separate housing. The present invention can be applied to machine housings into which a linear bearing is to be integrated.

The bearing unit of the present invention is thus advantageously designed to ensure that in the presence of a relatively high rigidity, a relatively uniform and uninterrupted intake of the load-bearing balls occurs. This significantly improves the operating properties of the bearing unit and reduces running noises during momentary load and shaft bending as well as in the presence of construction errors in the guide system.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A bearing unit comprising a housing provided with a cylindrical bore and a linear bearing positioned within the cylindrical bore, the linear bearing including a cage in which are arranged a plurality of endless ball rows each comprised of a longitudinally extending ball track for load-bearing balls, a longitudinally extending return track for non-load-bearing balls, and deflection tracks connecting ends of the longitudinally extending ball track and the longitudinally extending return track, each longitudinally extending ball track being open radially outwardly with a track plate being arranged to cover the longitudinally extending ball track for the load-bearing balls, the cylindrical bore of the housing being provided with at least annular groove located in an area of the cylindrical bore facing one axial end of one of the track plates to permit radial deflection of the one axial end of the track plate.

2. The bearing unit according to claim 1, wherein at least one side edge of the groove is oriented at an angle with respect to the cylindrical bore of the housing.

3. The bearing unit according to claim 1, wherein at least one side edge of the at least one recess is oriented at an angle with respect to the cylindrical bore of the housing.

4. The bearing unit according to claim 1, wherein the track plates each possess a radially inwardly facing groove-shaped track.

5. A bearing unit comprising a housing provided with a cylindrical bore and a linear bearing positioned within the cylindrical bore, the linear bearing including a cage in which is arranged at least one endless ball row comprised of a radially outwardly open longitudinally extending ball track for load-bearing balls, a longitudinally extending return track for non-load-bearing balls, and deflection tracks connecting ends of the longitudinally extending ball track and the longitudinally extending return track, the linear bearing also including a track plate covering the longitudinally extending ball track for the load-bearing balls, and including a space provided between an outer surface of the track plate at one axial end and an inner surface of the cylindrical bore of the housing for permitting radial deflection of the axial end of the track plate, the space between the outer surface of the track plate at the one axial end and the inner surface of the cylindrical bore of the housing being greater than the spacing between the outer surface of the track plate and the inner surface of the cylindrical bore in all portions of track plate between the axial ends of the track plate, the space between the outer surface of the track plate at the one axial end and the inner surface of the cylindrical bore of the housing being provided by an annular groove formed in the cylindrical bore.

6. The bearing unit according to claim 5, wherein the space between the outer surface of the track plate at the one axial end and the inner surface of the cylindrical bore of the housing is provided by a recess formed in the cylindrical bore.

7. The bearing unit according to claim 6, wherein at least one side edge of the recess is oriented at an angle with respect to the cylindrical bore of the housing.

8. The bearing unit according to claim 5, wherein the track plate possesses a radially inwardly facing groove-shaped track.

* * * * *